(12) United States Patent
Shibata et al.

(10) Patent No.: US 11,341,762 B2
(45) Date of Patent: May 24, 2022

(54) OBJECT DETECTION DEVICE, OBJECT DETECTION SYSTEM, OBJECT DETECTION METHOD, AND RECORDING MEDIUM HAVING PROGRAM RECORDED THEREON

(71) Applicant: NEC Corporation, Tokyo (JP)

(72) Inventors: Takashi Shibata, Tokyo (JP); Azusa Sawada, Tokyo (JP); Katsuhiko Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 2 days.

(21) Appl. No.: 17/058,796

(22) PCT Filed: May 29, 2018

(86) PCT No.: PCT/JP2018/020591
§ 371 (c)(1),
(2) Date: Nov. 25, 2020

(87) PCT Pub. No.: WO2019/229855
PCT Pub. Date: Dec. 5, 2019

(65) Prior Publication Data
US 2021/0201007 A1    Jul. 1, 2021

(51) Int. Cl.
*G06V 40/10* (2022.01)
*G06T 3/20* (2006.01)
*G06V 10/40* (2022.01)

(52) U.S. Cl.
CPC .......... *G06V 40/10* (2022.01); *G06T 3/20* (2013.01); *G06V 10/40* (2022.01)

(58) Field of Classification Search
None
See application file for complete search history.

(56) References Cited

U.S. PATENT DOCUMENTS 6,744,849 B2 * 6/2004 Nagatsuka ............ G06T 5/009
378/62
7,982,774 B2 * 7/2011 Tsunashima ........... G06T 7/254
348/208.6

(Continued)

FOREIGN PATENT DOCUMENTS

EP    1202214 A2    5/2002
JP    2002-203240 A    7/2002

(Continued)

OTHER PUBLICATIONS

International Search Report corresponding to PCT/JP2018/020591, dated Jul. 17, 2018 (3 pages).
Written Opinion corresponding to PCT/JP2018/020591, dated Jul. 17, 2018 (4 pages).

(Continued)

*Primary Examiner* — Anand P Bhatnagar

(57) ABSTRACT

The purpose of the present invention is to detect an object in images accurately by means of image recognition without using a special device for removing the influence of the parallax between a plurality of images. An image transformation unit (401) transforms a plurality of images acquired by an image acquisition unit (407). A reliability level calculation unit (402) calculates a level of reliability representing how small the misalignment between images is. A score calculation unit (405) calculates a total score taking into account both an object detection score based on a feature quantity calculated by a feature extraction unit (404), and the level of reliability calculated by the reliability level calculation unit (402). An object detection unit (406) detects an object in the images on the basis of the total score.

9 Claims, 6 Drawing Sheets

(56) References Cited

U.S. PATENT DOCUMENTS

| | | | | |
|---|---|---|---|---|
| 10,121,244 B2* | 11/2018 | Gruenwald | ............ | G06T 7/0012 |
| 10,853,625 B2* | 12/2020 | McCombe | ......... | G06K 9/00281 |
| 10,903,264 B2* | 1/2021 | Nozawa | ................. | H04N 5/349 |
| 11,182,590 B2* | 11/2021 | Ptucha | ............... | G06K 9/00281 |
| 2002/0051578 A1* | 5/2002 | Imagawa | ............. | G06K 9/4609 |
| | | | | 382/224 |
| 2003/0099373 A1* | 5/2003 | Joo | ....................... | G06T 1/0057 |
| | | | | 382/100 |
| 2004/0022440 A1* | 2/2004 | Akahori | ................... | G06K 9/46 |
| | | | | 382/224 |
| 2011/0019910 A1* | 1/2011 | Kameyama | ............... | G06T 5/50 |
| | | | | 382/163 |
| 2011/0187900 A1* | 8/2011 | Park | ........................ | G06K 9/00 |
| | | | | 348/239 |
| 2012/0026354 A1* | 2/2012 | Hamada | ............... | G06K 9/6202 |
| | | | | 348/222.1 |
| 2012/0082370 A1* | 4/2012 | Yasukawa | ............ | G06K 9/6215 |
| | | | | 382/154 |

FOREIGN PATENT DOCUMENTS

| | | |
|---|---|---|
| JP | 2010-225107 A | 10/2010 |
| JP | 2012-185712 A | 9/2012 |

OTHER PUBLICATIONS

Soonmin Hwang, Jaesik Park, Namil Kim, Yukyung Choi, and In So Kweon, "Multispectral Pedestrian Detection: Benchmark Dataset and Baseline." Proceedings of the IEEE Conference on Computer Vision and Pattern Recognition. Jun. 7, 2015 (Jun. 7, 2015), pp. 1037-1045.

He Kaiming, Jian Sun, and Xiaoou Tang, "Guided image filtering." European conference on computer vision. Springer, Berlin, Heidelberg, Sep. 5, 2010 (Sep. 5, 2010), pp. 1-14.

Dollar, P., Appel, R., Belongie, S., and Perona, P. (2014). Fast feature pyramids for object detection. IEEE Transactions on Pattern Analysis and Machine Intelligence (PAMI), 36(8), 1532-1545, Aug. 1, 2014 (Aug. 1, 2014).

Takashi Shibata, Masayuki Tanaka, and Masatoshi Okutomi. "Misalignment—Robust Joint Filter for Cross-Modal Image Pairs." Proceedings of the IEEE Conference on Computer Vision and Pattern Recognition. Oct. 22, 2017 (Oct. 22, 2017), pp. 3295-3304.

Takashi Shibata, Masayuki Tanaka, and Masatoshi Okutomi. "Unified image fusion based on application-adaptive importance measure." Image Processing (ICIP), 2015 IEEE International Conference on. IEEE, Sep. 27, 2015 (Sep. 27, 2015), pp. 1-5.

Shen, Xiaoyong, et al. "Multi-modal and multi-spectral registration for natural images." European Conference on Computer Vision. Springer, Cham, Sep. 4, 2014 (Sep. 4, 2014), pp. 309-324.

* cited by examiner

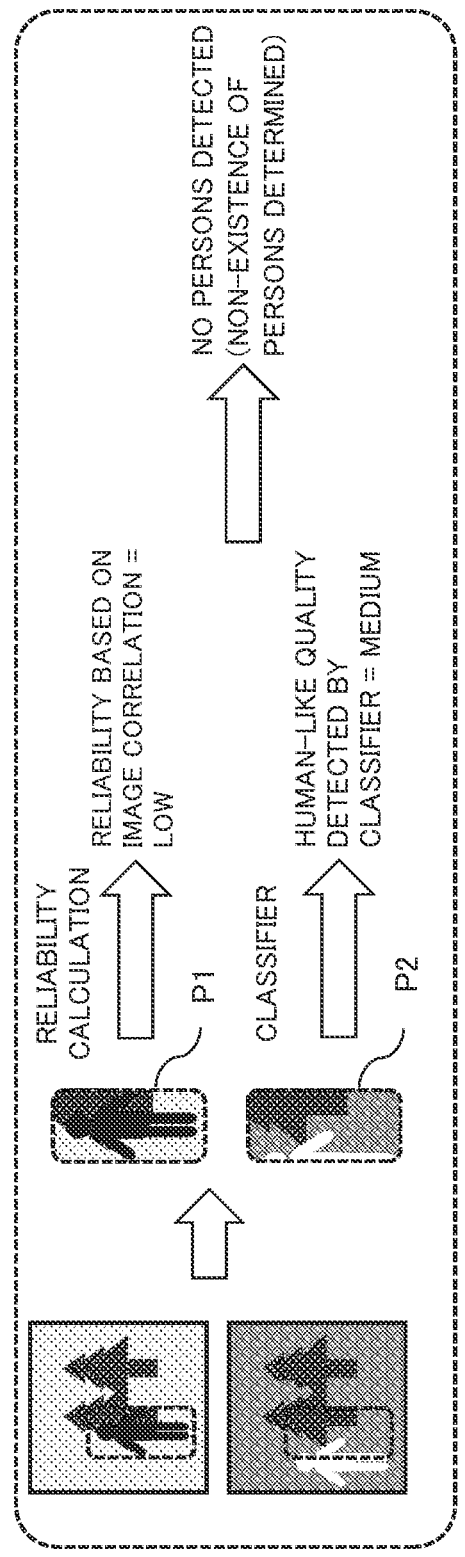

OBJECT DETECTION DEVICE, OBJECT DETECTION SYSTEM, OBJECT DETECTION METHOD, AND RECORDING MEDIUM HAVING PROGRAM RECORDED THEREON

TECHNICAL FIELD

This application is a national stage application based upon and claims the benefit of the priority of International Patent Application No. PCT/JP2018/020591, entitled, OBJECT DETECTION DEVICE, OBJECT DETECTION SYSTEM, OBJECT DETECTION METHOD, AND RECORDING MEDIUM HAVING PROGRAM RECORDED THEREON, filed on May 29, 2018, which is incorporated herein in its entirety. Embodiments of this invention relate to a technique for detecting an object in an image by image recognition.

BACKGROUND ART

There are object detection devices that detect, through image recognition, an object included in an image acquired from an imaging device such as a camera or a sensor. In an image recognition process, the use of another image in another wavelength region (far-infrared region, for example) in combination with the use of an image in one wavelength region (visible light region, for example) can cope with more diverse kinds of scenes than the use of an image in only one wavelength region, and accordingly, increases object detection accuracy.

To acquire images in two wavelength regions, more than one imaging device is normally required. Between a plurality of imaging devices, there is a parallax based on the positional relationship. That is, the position of the same object appears to be different between an image obtained by one imaging device and an image obtained by another imaging device.

Referring now to FIG. 6, an example of a related technology and its problem are described. In FIG. 6, upper and lower images are captured by different imaging devices from each other. In FIG. 6, rectangular regions P1 and P2 from which an object is to be detected are indicated by dashed lines in the images captured by the two imaging devices. In the example shown in FIG. 6, the rectangular region P1 in the upper image includes an object. However, because of the parallax between the two imaging devices, the corresponding rectangular region P2 in the lower image does not completely include the person. Therefore, the result of human-like quality detection by a classifier is poor. As a result, there are cases where the person present in the rectangular regions P1 and P2 cannot be accurately detected by the related technology.

NPL 1 discloses a technique for eliminating the influence of parallax between images with the use of a special device.

CITATION LIST

Non Patent Literatures

[NPL 1] Soonmin Hwang, Jaesik Park, Namil Kim, Yukyung Choi, and In So Kweon, "Multispectral Pedestrian Detection: Benchmark Dataset and Baseline." Proceedings of the IEEE Conference on Computer Vision and Pattern Recognition. 7 Jun. 2015 (07-06-2015).

[NPL 2] He Kaiming, Jian Sun, and Xiaoou Tang, "Guided image filtering." European conference on computer vision. Springer, Berlin, Heidelberg, 5 Sep. 2010 (05-09-2010).

[NPL 3] Dollar, P., Appel, R., Belongie, S., and Perona, P. (2014). Fast feature pyramids for object detection. IEEE Transactions on Pattern Analysis and Machine Intelligence (PAMI), 36(8), 1532-1545, 1 Apr. 2014 (01-04-2014).

[NPL 4] Takashi Shibata, Masayuki Tanaka, and Masatoshi Okutomi. "Misalignment—Robust Joint Filter for Cross-Modal Image Pairs." Proceedings of the IEEE Conference on Computer Vision and Pattern Recognition. 22 Oct. 2017 (22-10-2017).

[NPL 5] Takashi Shibata, Masayuki Tanaka, and Masatoshi Okutomi. "Unified image fusion based on application-adaptive importance measure." Image Processing (ICIP), 2015 IEEE International Conference on. IEEE, 27 Sep. 2015 (27-09-2015).

[NPL 6] Shen, Xiaoyong, et al. "Multi-modal and multi-spectral registration for natural images." European Conference on Computer Vision. Springer, Cham, 4 Sep. 2014 (04-09-2014).

SUMMARY OF INVENTION

Technical Problem

However, the technique disclosed in NPL 1 has a problem that the cost of the special device for eliminating the influence of parallax is high. Further, by the technique disclosed in NPL 1, it is necessary to accurately align images obtained with two imaging devices. In practice, however, it is difficult to completely correct a positional difference between images.

An objective of the present invention is to detect an object in an image by image recognition with high precision, without use of any special device for eliminating the influence of parallax between a plurality of images.

Solution to Problem

To solve the above problem, an object detection device according to an aspect of the present invention includes: an image transforming means for transforming, of a first image and a second image that are captured by one or more imaging devices, the second image to make a transformed second image; a reliability calculating means for calculating a reliability indicating how small a positional difference between the first image and the transformed second image is; an integrated image generating means for generating an integrated image by integrating each pixel of the first image and each corresponding pixel of the transformed second image; a feature extracting means for extracting a feature amount from the integrated image, and calculating an object detection score indicating a probability that the integrated image includes an object, using the extracted feature amount; a score calculating means for calculating an overall score, with both a degree of the reliability and a level of the object detection score being taken into consideration; and an object detecting means for detecting an object included in the integrated image, based on the overall score.

To solve the above problem, an object detection method according to an aspect of the present invention includes: transforming, of a first image and a second image that are captured by one or more imaging devices, the second image to make a transformed second image; calculating a reliability indicating how small a positional difference between the first image and the transformed second image is; generating an integrated image by integrating each pixel of the first image and each corresponding pixel of the transformed second image; extracting a feature amount from the integrated image, and calculating an object detection score indicating a probability that the integrated image includes an object, using the extracted feature amount; calculating an overall score, with both a degree of the reliability and a level of the object detection score being taken into consideration; and detecting an object included in the integrated image, based on the overall score.

To solve the above problem, a recording medium according to an aspect of the present invention stores a program for causing a computer to: transform, of a first image and a second image that are captured by one or more imaging devices, the second image to make a transformed second image; calculate a reliability indicating how small a positional difference between the first image and the transformed second image is; generate an integrated image by integrating each pixel of the first image and each corresponding pixel of the transformed second image; extract a feature amount from the integrated image, and calculate an object detection score indicating a probability that the integrated image includes an object, using the extracted feature amount; calculate an overall score, with both a degree of the reliability and a level of the object detection score being taken into consideration; and detect an object included in the integrated image, based on the overall score.

Advantageous Effects of Invention

According to one aspect of the present invention, an object in an image can be detected with high accuracy.

BRIEF DESCRIPTION OF DRAWINGS

FIG. 6 is a diagram for explaining the problem with a related technology.

EXAMPLE EMBODIMENTS

Modes for carrying out the present invention will be described in detail, with reference to the drawings.

First Example Embodiment

Figure 1:
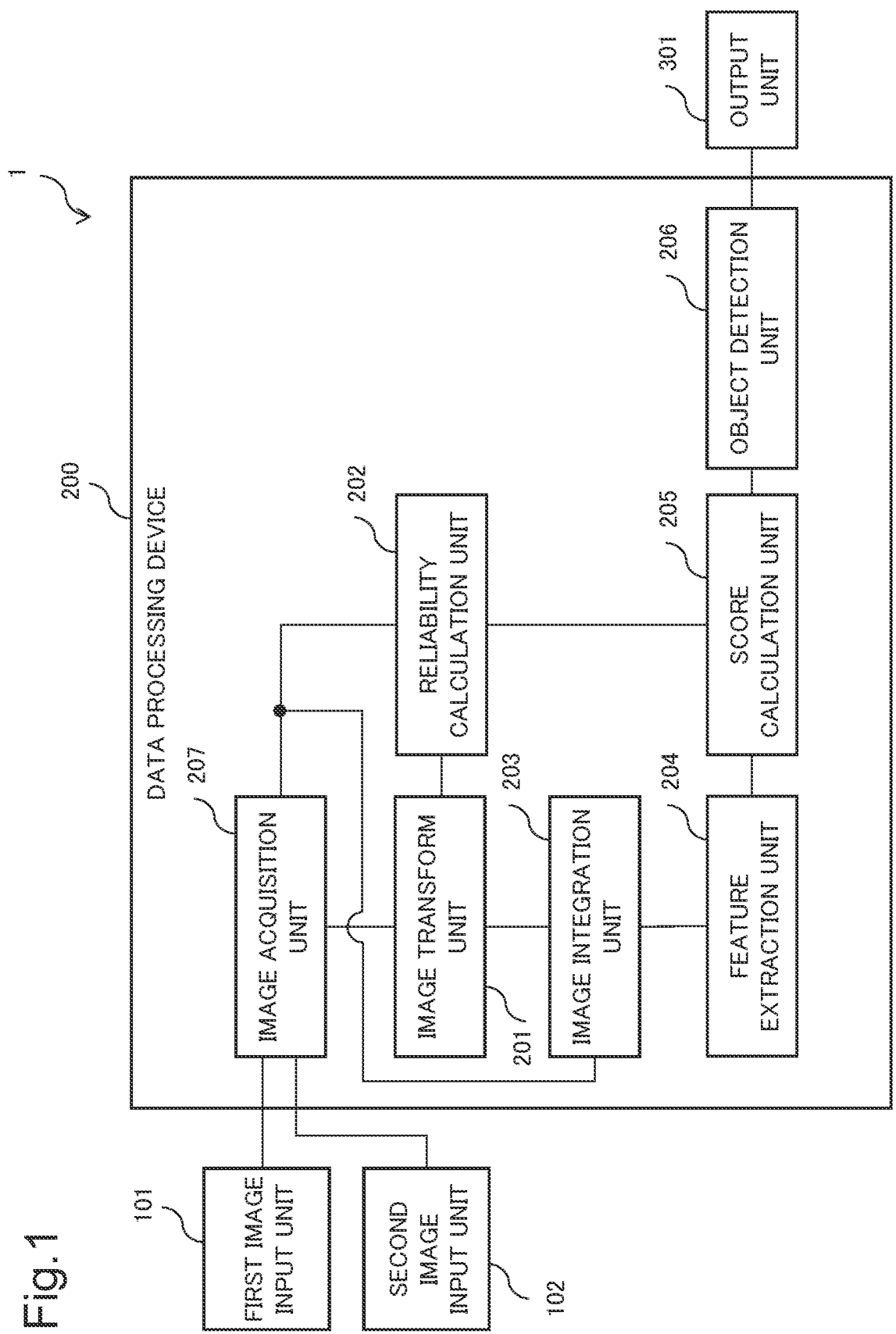
FIG. 1 is a block diagram showing the configuration of an image processing system according to a first example embodiment.

FIG. 1 is a block diagram showing a schematic configuration of an image processing system 1 according to the present example embodiment. Referring to FIG. 1, the image processing system 1 includes a first image input unit 101, a second image input unit 102, a data processing device 200, and an output unit 301.

(Data Processing Device 200)

The data processing device 200 is formed with a computer operating under program control. As shown in FIG. 1, the data processing device 200 includes an image transform unit 201, a reliability calculation unit 202, an image integration unit 203, a feature extraction unit 204, a score calculation unit 205, an object detection unit 206, and an image acquisition unit 207. Each of these components operates as described below. The data processing device 200 according to the present example embodiment is an example of an object detection device.

(First Image Input Unit 101)

The first image input unit 101 acquires the data of one or more images including an object, which is the data of one or more frames, from an imaging device (not shown) such as a camera or a sensor. The first image input unit 101 inputs the acquired image data to the data processing device 200. The first image input unit 101 stores the acquired image data into a memory (not shown) or the like. The image to be acquired by the first image input unit 101 may be a visible image acquired by a camera, or may be a temperature image or a depth image acquired from a sensor. The first image input unit 101 may further acquire the data of various measurement values measured by sensors. In the description below, the image that is input to the data processing device 200 by the first image input unit 101 and the data relating thereto will be collectively referred to as the first image.

The first image may be a multi-channel image such as a processing result in the middle of deep learning. Alternatively, the first image may be vector data (a velocity field, a density field, or the like) calculated by numerical simulation or the like.

Hereinafter, the first image may be written as I1 (j, m). Here, j is an index indicating the numbers for identifying the pixels in the first image, and m is an index indicating the numbers for determining which one of the first images to be input by the first image input unit 101 is the first image, and, in other words, is an index indicating the numbers assigned to the respective frames of the first image.

(Second Image Input Unit 102)

The second image input unit 102 acquires the data of one or more images including an object, from an imaging device such as a camera or a sensor. The second image input unit 102 inputs the acquired image data to the data processing device 200. The second image input unit 102 stores the acquired image data into a memory (not shown) or the like.

The image to be acquired by the second image input unit 102 may be a visible image, or may be a temperature image, a depth image, or the like acquired from a sensor. The second image input unit 102 may further acquire the data of various measurement values measured by sensors.

The second image input unit 102 acquires an image in a wavelength region different from that of the first image. For example, in a case where the first image is an image in a visible light region, the image to be acquired by the second image input unit 102 may be an image in a far-infrared region or a near-infrared region synchronized with the first image, for example. In the description below, the image that is input to the data processing device 200 by the second image input unit 102 and the data relating thereto will be collectively referred to as the second image.

Hereinafter, the second image may be written as 12 (j, n). Here, j is an index indicating the numbers for identifying the pixels in the second image, and n is an index indicating the numbers for determining which one of the second images to be input by the second image input unit 102 is the second image, and, in other words, is an index indicating the numbers assigned to the respective frames of the second image.

(First Image and Second image)

The first image and the second image may be captured by different imaging devices, or may be captured by one imaging device. In a case where the first image and the second image are captured by one imaging device, the data processing device 200 acquires a plurality of images captured by the imaging device, and classifies the images into a first image group and a second image group, depending on imaging conditions such as wavelength regions and time.

Alternatively, the imaging device that is used to capture the second image may be the same as the imaging device that is used to capture the first image. In this case, the time at which the second image is captured is slightly different from the time at which the first image is captured. For example, in a case where the imaging devices that are used to capture the first image and the second image are imaging devices using an RGB frame sequential method like an endoscope, the first image may be one frame, and the second image may be the next frame.

Alternatively, the imaging devices that are used to capture the first image and the second image may be mounted on satellites. For example, the first image may be an image from an optical satellite, and the second image may be an image from a satellite that acquires wide-area temperature information or radio wave information. In this case, the times for capturing the first image and the second image from these satellites may be the same or different.

The first image input unit 101 and the second image input unit 102 may perform various kinds of image processing, such as denoising, tone mapping, super-resolution processing, blur removal, or image fusion processing, on the acquired first image and second image, respectively.

(Image Acquisition Unit 207)

The image acquisition unit 207 acquires the first image that has been input to the data processing device 200 from the first image input unit 101, and acquires the second image that has been input to the data processing device 200 from the second image input unit 102. The image acquisition unit 207 outputs the data of the acquired second image to the image transform unit 201. The image acquisition unit 207 also outputs the data of the acquired first image to both the reliability calculation unit 202 and the image integration unit 203.

(Image Transform Unit 201)

The image transform unit 201 receives the data of the second image from the image acquisition unit 207. The image transform unit 201 transforms or converts the second image input from the second image input unit 102, to make a transformed second image. For example, the image transform unit 201 performs geometric transform such as parallel translation on the second image, to make a transformed second image. The image transform unit 201 may generate a plurality of transformed second images from one second image by performing a plurality of kinds of transform or conversion.

For example, the image transform unit 201 subjects the second image to one or more kinds of parallel translation, such as "one pixel to the right", "two pixels to the right", "three pixels to the right", "no transform", "one pixel to the left", "two pixels to the left", and "three pixels to the left", to make one or more transformed second images. The image transform unit 201 outputs the one or more transformed second images generated in this manner to the reliability calculation unit 202 and the image integration unit 203, and stores the one or more transformed second images into a memory (not shown).

Alternatively, the image transform unit 201 may subject the second image to transform or conversion other than parallel translation. For example, the image transform unit 201 may subject the second image to homography transform, affine transform, Helmert transform, or the like. The image transform unit 201 may also prepare a plurality of parameters characterizing a plurality of kinds of transform, and generate a transformed second image for each parameter.

Alternatively, the image transform unit 201 may determine the type of transform (such as parallel translation) to be performed on the second image, depending on the characteristics of the imaging device that has captured the second image.

For example, the imaging device that is used by the first image input unit 101 to acquire the first image, and the imaging device that is used by the second image input unit 102 to acquire the second image are positioned side by side in spatial terms. In this case, the image transform unit 201 may generate a transformed second image by translating each pixel of the second image along the epipolar line corresponding to the layout of these imaging devices.

Hereinafter, a transformed second image may be written as J(j, n, k). Here, j is an index indicating the numbers for identifying the pixels in a transformed second image, and n is an index indicating the number for identifying the second image from which the transformed second image originates. Further, k is an index indicating the number for identifying one of transformed second images generated from one second image by the image transform unit 201. In other words, the index k indicates the type of transform or conversion performed on the second image.

(Reliability Calculation Unit 202)

The reliability calculation unit 202 acquires the first image from the image acquisition unit 207. The reliability calculation unit 202 also acquires the transformed second image generated by the image transform unit 201.

The reliability calculation unit 202 calculates the reliability for each pixel (index j) of the first image, on the basis of the strength of the correlation between the transformed second image J (j, n, k) generated by the image transform unit 201 and the first image I1 (j, m) generated by the first image input unit 101. The reliability indicates the degree of probability that the pixels of the first image and the corresponding pixels of the transformed second image are associated with the same object (person). In other words, the reliability indicates how small the positional difference between the spatial region included in the first image and the spatial region included in the transformed second image is.

The reliability calculation unit 202 outputs information about the calculated reliability to the score calculation unit 205.

To calculate the above reliability, the reliability calculation unit 202 may use a robust function and a normalized cross-correlation (NPL 6), or may use mutual information, a sum of squared difference, or a sum of absolute difference, for example.

Alternatively, the reliability calculation unit 202 can calculate the reliability, using the cost function of the guided filter disclosed in NPL 2. The cost function E(j, k) is expressed by Equation 1, Equation 2, or Equation 3 shown below, for example.

The reliability calculation unit 202 calculates the sum of squared difference between the transformed second image J(j, n, k) and a linearly transformed first image I1(j, m).

$$E(j,k)=\Sigma n,m\{(a1\times I1(j,m)+b1-J(j,n,k))^2\} \quad \text{(Equation 1)}$$

$$E(j,k)=\Sigma n,m\{(a2\times J(j,n,k)+b2-I1(j,m))^2\} \quad \text{(Equation 2)}$$

$$E(j,k)=\Sigma n,m\{(a1\times I1(j,m)+b1-J(j,n,k))^2 +(a2\times J(j,n,k)+b2-I1(j,m))^2\} \quad \text{(Equation 3)}$$

In the cost functions shown above in Equation 1, Equation 2, and Equation 3, the coefficients a1, a2, b1, and b2 can be calculated with the technique disclosed in NPL 2.

It should be noted that the cost function and the reliability are inversely correlated with each other. As the value of the cost function decreases, the positional difference between the transformed second image J(j, n, k) and the linearly transformed first image I1(j, m) becomes smaller, and accordingly, the reliability is high. In one example, the reliability calculation unit 202 may use the inverse of the cost function as the reliability, or may use a value obtained by subtracting the cost function from a constant as the reliability.

Alternatively, the reliability calculation unit 202 may use a softmax function or the like, instead of the cost function. In this case, the reliability calculation unit 202 calculates the reliability based on the softmax function.

The reliability calculation unit 202 may normalize the reliability as described below.

First, the reliability calculation unit 202 selects the cost function having the smallest value, using Equation 4 shown below. In Equation 4 shown below, N1(j) is a set formed with a certain pixel (index j) and the pixels surrounding the certain pixel.

$$\hat{E}(j, k') = \min_{j' \in N_1(j)} E(j', k') \quad \text{(Equation 4)}$$

Alternatively, the reliability calculation unit 202 may select the cost function having the smallest value, using Equation 4a shown below.

$$\hat{E}(j, k) = \theta\left(E(j, k) - \min_{k'} E(j, k') - E_0\right) \quad \text{(Equation 4a)}$$

Here, θ(•) ("•" represents an argument) is a function for outputting "1" when the argument "•" is equal to or smaller than zero, and outputting "0" in any other cases. E0 is a parameter set by the user, and has a value greater than 0.

Next, according to Equation 5 shown below, the reliability calculation unit 202 performs smoothing on the cost function having the smallest value, which has been selected on the basis of Equation 4 or 4a. In Equation 5 shown below, W(k', k) is a smoothing filter, such as a Gaussian filter. N2(k) is a set formed with all the transformed second images that the image transform unit 201 has generated from one second image.

$$\hat{S}(j, k) = \sum_{k' \in N_2(k)} W(k', k) \cdot \hat{E}(j, k') \quad \text{(Equation 5)}$$

After that, the reliability calculation unit 202 normalizes the smoothed cost function, using Equation 6 shown below. The function S(j, k) shown on the left side of Equation 6 has a minimum value of 0 and a maximum value of 1. The function S(j, k) is the normalized reliability.

$$S(j, k) = \frac{\hat{S}(j, k) - \min_k \hat{S}(j, k)}{\max_k \hat{S}(j, k) - \min_k \hat{S}(j, k)} \quad \text{(Equation 6)}$$

(Image Integration Unit 203)

The image integration unit 203 acquires the first image from the image acquisition unit 207. The image integration unit 203 also acquires the transformed second image generated by the image transform unit 201.

The image integration unit 203 generates one integrated image by integrating the first image I1(j, m) and the transformed second image J(j, n, k). Here, "Integration" means combining the data of the pixel values of two corresponding pixels of the first image I1(j, m) and the transformed second image J(j, n, k). This set of pixel value data is called the "integrated image". Accordingly, each pixel of the integrated image has the pixel values of pixels of both the first image I1(j, m) and the transformed second image J(j, n, k).

That is, instead of adding the pixel value of a pixel j in the wavelength region A of the first image I1(j, m) to the pixel value of the pixel j in the wavelength region B of the transformed second image J(j, n, k), the image integration unit 203 puts the data of these pixel values side by side in the memory, and stores the data as the pixel value data of the pixel j in the wavelength region (A+B) of the integrated image. In this manner, the image integration unit 203 determines the pixel value of each pixel (index j) of the integrated image.

Hereinafter, the integrated image will be written as T(j, c, k). The index c indicates the number for identifying one integrated image.

The image integration unit 203 outputs the generated integrated image to the feature extraction unit 204.

(Feature Extraction Unit 204)

The feature extraction unit 204 extracts feature amounts from the integrated image T(j, c, k) generated by the image integration unit 203. For example, the feature extraction unit 204 may extract a feature amount such as HoG (Histogram of Gradient) or SIFT (Scale-Invariant Feature Transform) from the integrated image T(j, c, k).

To extract a feature amount from each rectangular region of the integrated image T(j, c, k), the feature extraction unit 204 may use aggregate channel features (ACF) disclosed in NPL 3, or deep learning.

The feature extraction unit 204 calculates an object detection score for each rectangular region with a classifier, on the basis of the feature amounts extracted from the respective rectangular regions of the integrated image T(j, c, k). For example, the feature extraction unit 204 inputs the feature amount of each rectangular region to the classifier, and the classifier performs a learning process to detect an object. On the basis of the results of the learning performed by the classifier, the feature extraction unit 204 calculates object detection scores indicating object-like quality of the rectangular regions. The feature extraction unit 204 stores the object detection scores calculated in this manner into a memory (not shown).

For example, the feature extraction unit 204 may calculate an object detection score, using the method disclosed in the NPL 3. NPL 3 discloses a method for detecting an object in an image, using AdaBoost.

However, the feature extraction unit 204 may use random forest or support vector regression, or may use deep learning, instead of AdaBoost.

When the feature extraction unit 204 calculates an object detection score using any of the methods described above, a learning image and correct data are required. The learning image is a set of a first image and a second image with no positional difference. The correct data is a label indicating where the object to be detected is located in one set of images. For example, the label may be coordinates representing a rectangular region that includes an object (a person, for example) in each of the first and second images.

Hereinafter, an object detection score may be written as S2(b, k). Here, b is an index indicating the number for identifying a rectangular region including an object, and k is an index indicating the number for identifying one of transformed second images generated from one second image by the image transform unit 201.

(Score Calculation Unit 205)

The score calculation unit 205 calculates an overall score for each rectangular region in the integrated image, from the reliability calculated by the reliability calculation unit 202 and the object detection score calculated by the feature extraction unit 204. An overall score indicates the probability that a rectangular region in the integrated image includes an object.

In one example, the score calculation unit 205 calculates an overall score S(b, k) according to Equation 7 shown below. In Equation 7, α is a weight parameter. The weight parameter α may be set by the user in advance, for example.

$$S(b,k) = \alpha \times \langle S1(b,k) \rangle + S2(b,k) \qquad \text{(Equation 7)}$$

In Equation 7, $\langle S1(b, k) \rangle$ indicates the value obtained by averaging the degrees of reliability S1(j, k) of all the pixels (index j) included in the bth rectangular region in the kth transformed second image. Alternatively, $\langle S1(b, k) \rangle$ may simply be the sum of the degrees of reliability S1(j, k) of all the pixels (index j) included in the bth rectangular region in the kth transformed second image.

Alternatively, $\langle S1(b, k) \rangle$ may be the weighted average of the degrees of reliability S1(j, k) of all the pixels (index j) included in the bth rectangular region in the kth transformed second image. For example, the score calculation unit 205 adds a large weight to the reliability of the pixel (the center of a rectangular region, for example) in a region where the possibility of existence of an object is high in the bth rectangular region. On the other hand, the score calculation unit 205 adds a small weight to the reliability of an image (an edge of a transformed second image) in a region where the possibility of existence of an object is low.

In another example, the score calculation unit 205 may perform non-linear transform on the average or the sum of degrees of reliability $\langle S1(b, k) \rangle$ and the object detection score S2(b, k), and then add up the results, as shown in Equation 8 below. Parameters β1 and β2 may be set by the user in advance, for example.

$$S(b,k) = \exp(-\beta 1 \times \langle S1(b,k) \rangle) + \exp(-\beta 2 \times S2(b,k)) \qquad \text{(Equation 8)}$$

Alternatively, the score calculation unit 205 may use a non-linear function F having the arguments $\langle S1(b, k) \rangle$ and S2(b, k), as the overall score S (b, k), as shown in Equation 9 below. The non-linear function F is an increasing function for both arguments $\langle S1(b, k) \rangle$ and S2(b, k). That is, in a case where $\langle S1(b, k) \rangle$ is a fixed value, the higher S2(b, k), the higher the overall score S(b, k). In a case where S2(b, k) is a fixed value, the higher $\langle S1(b, k) \rangle$, the higher the overall score S(b, k).

$$S(b,k) = F(\langle S1(b,k) \rangle, S2(b,k)) \qquad \text{(Equation 9)}$$

In this manner, the score calculation unit 205 calculates the overall score, with both the reliability and the object detection score being taken into consideration. For example, in the present example embodiment, the score calculation unit 205 calculates the overall score that is an increasing function for both the reliability and the object detection score.

[Example Modification]

In an example modification, the score calculation unit 205 may add the value of the reliability S(j, k) to the average or the sum $\langle S1(b, k) \rangle$ of the degrees of reliability described above, only for each set of parameters (j, k) with degrees of reliability S((j, k) equal to or higher than a threshold. As a result, the computer resources to be consumed for calculating the average or the sum $\langle S1(b, k) \rangle$ of degrees of reliability can be reduced.

(Object Detection Unit 206)

The object detection unit 206 detects an object included in the integrated image T(j, c, k), on the basis of the overall score S(b, k) calculated by the score calculation unit 205. For example, in a case where the overall score S(b, k) is equal to or higher than a threshold, the object detection unit 206 may determine that an object exists in the bth rectangular region of the integrated image T(j, c, k).

In this manner, the object detection unit 206 determines whether an object exists, for all the rectangular regions in the integrated image. The object detection unit 206 may transmit the result of the object detection performed on all the rectangular regions in the integrated image, to the output unit 301.

Alternatively, the object detection unit 206 may select one representative rectangular region from a plurality of rectangular regions including an object in one integrated image. For example, the object detection unit 206 may select the rectangular region having the highest overall score from the plurality of rectangular regions. In this case, the object detection unit 206 transmits only information indicating the rectangular region having the highest overall score, as the object detection result to the output unit 301.

Alternatively, in a case where the coordinates defining a plurality of rectangular regions are sufficiently close to one another (the distances between the coordinates are within a first predetermined value, for example), and the object detection scores for the plurality of rectangular regions have values close to one another (the differences between the values are within a second predetermined value, for example), the object detection unit 206 may transmit only information indicating the rectangular region having the highest overall score, as the object detection result to the output unit 301.

The data processing device 200 may further include a means that generates and outputs an integrated image having a higher visibility than the first image or transformed second images, using a method disclosed in the NPL 4 or NPL 5. In this case, the image integration unit 203 transmits the integrated image with improved visibility, together with the result of object detection performed by the object detection unit 206, to the output unit 301.

(Output Unit 301)

In a case where the output unit 301 receives only an object detection result from the object detection unit 206, the output unit 301 outputs only the object detection result.

In a case where the data processing device 200 further includes the above described means that generates an integrated image with a higher visibility, the output unit 301 outputs a display image in which objects such as an arrow and a frame indicating the rectangular region from which an object has been detected are superimposed on the integrated image having the higher visibility. Thus, the user can recognize the position at which the object has been detected by checking the display image output from the output unit 301.

[Description of Operation]

Figure 2:
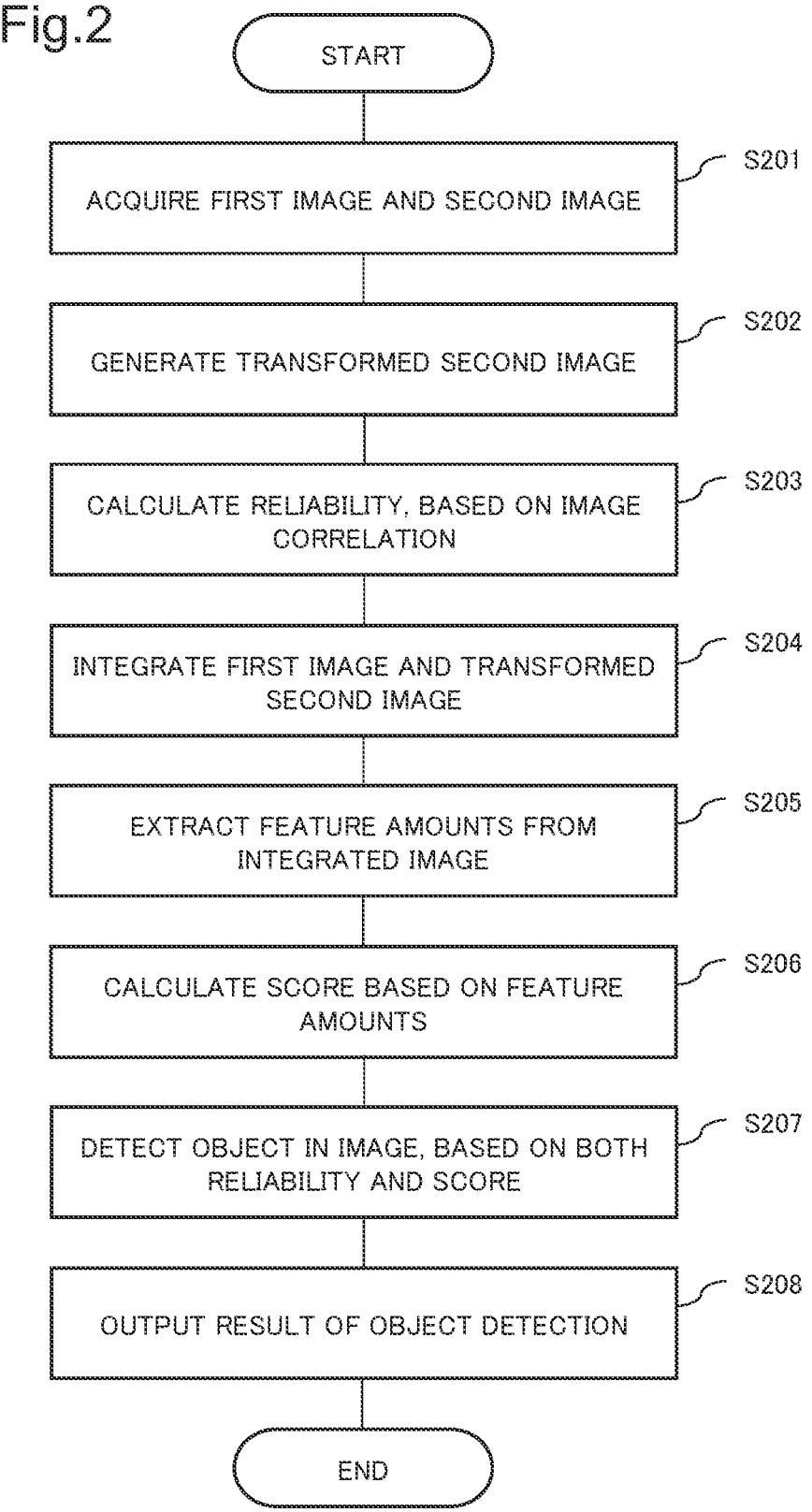
FIG. 2 is a flowchart for explaining an operation of the data processing device provided in the image processing system according to the first example embodiment.
Figure 3:
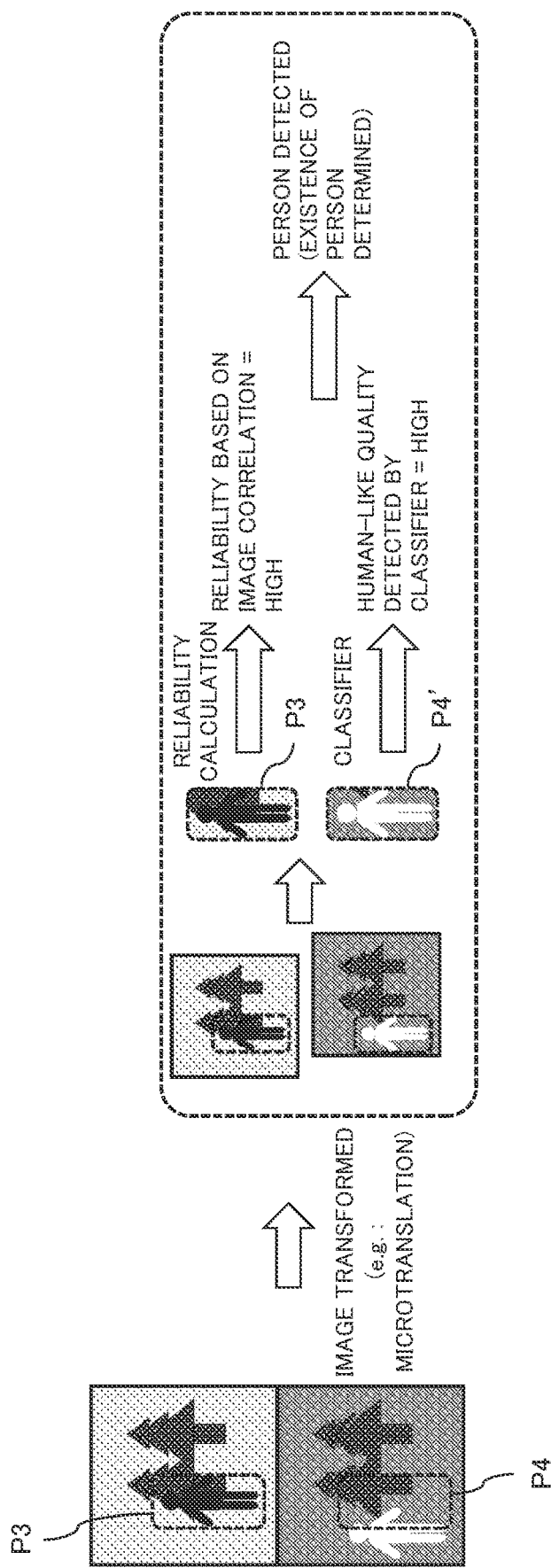
FIG. 3 is a diagram illustrating the effects of the configuration according to the first example embodiment.

Referring now to FIGS. 2 and 3, the flow of an operation of the data processing device 200 is described. FIG. 2 is a flowchart showing the flow of an operation to be performed by the data processing device 200. FIG. 3 is a diagram for explaining the effects to be achieved by the configuration according to the present example embodiment.

As shown in FIG. 2, the image acquisition unit 207 acquires the data of a first image from the first image input unit 101, and acquires the data of a second image from the second image input unit 102 (S201).

In FIG. 3, the upper image is an example of the first image, and the lower image is an example of the second image. Each of the dashed-line frames P3 and P4 shown in FIG. 3 is one of the rectangular regions from which an object is to be detected. The rectangular regions P3 and P4 correspond to each other. That is, the rectangular region P3 and the rectangular region P4 represent the same region in the same coordinate system. The shape of the region from which an object is to be detected is not limited to any particular shape.

The image transform unit 201 transforms the second image acquired by the image acquisition unit 207, to make a transformed second image (S202).

For example, the image transform unit 201 performs translation (microtranslation toward the right in FIG. 3) on the second image, to make a transformed second image. At this stage, the image transform unit 201 does not translate the rectangular region P4 in the second image, together with the second image. That is, the rectangular region P4' in the transformed second image remains at the position corresponding to the region P3 in the first image.

The reliability calculation unit 202 calculates reliability, on the basis of the correlation between the first image and the transformed second image (S203). The reliability is the value indicating the smallness of the positional difference between the first image and the transformed second image.

Next, the image integration unit 203 generates an integrated image in which the pixel values of the transformed second image and the pixel values of the first image are integrated (S204).

The feature extraction unit 204 extracts a feature amount from each rectangular region in the integrated image, and calculates an object detection score for each rectangular region (S205).

The score calculation unit 205 calculates an overall score in accordance with a function shown in one of the above Equations 7 to 9, for example, on the basis of the reliability calculated by the reliability calculation unit 202 and the object detection score calculated by the feature extraction unit 204 (S206).

The object detection unit 206 detects an object in the integrated image, on the basis of the overall score calculated by the score calculation unit 205 (S207).

Lastly, the output unit 301 outputs information indicating the rectangular region from which the object detection unit 206 has detected an object (S208).

Alternatively, in a case where the data processing device 200 further includes the above described means that generates an integrated image with a higher visibility, the output unit 301 outputs a display image in which objects such as an arrow and a frame indicating the rectangular region from which an object has been detected are superimposed on the integrated image having the higher visibility.

(Effects of the Present Example Embodiment)

According to the configuration of the present example embodiment, a data processing device acquires a first image and a second image from one or more imaging devices. The first image and the second image have different wavelength regions. The data processing device transforms the second image, to make a transformed second image.

The reliability is then calculated from the correlation between the transformed second image and the first image. The smaller the positional difference between the transformed second image and the first image, the higher the reliability.

The data processing device also generates an integrated image in which the transformed second image and the first image are integrated, extracts a feature amount from the generated integrated image, and, on the basis of the extracted feature amount, calculates an object detection score indicating the probability that the integrated image includes an object. The data processing device then calculates an overall score, on the basis of the calculated reliability and the object detection score.

The overall score is an increasing function for both the reliability and the object detection score. That is, in a case where the object detection score is a fixed value, the higher the reliability, the higher the overall score. In a case where the reliability is a fixed value, the higher the object detection score, the higher the overall score.

The data processing device detects an object from the integrated image, using the overall score calculated in this manner. Thus, the object in the integrated image can be detected with high accuracy.

Second Example Embodiment

In the present example embodiment, an essential configuration for solving the problem is described.

(Object Detection Device 400)

Figure 4:
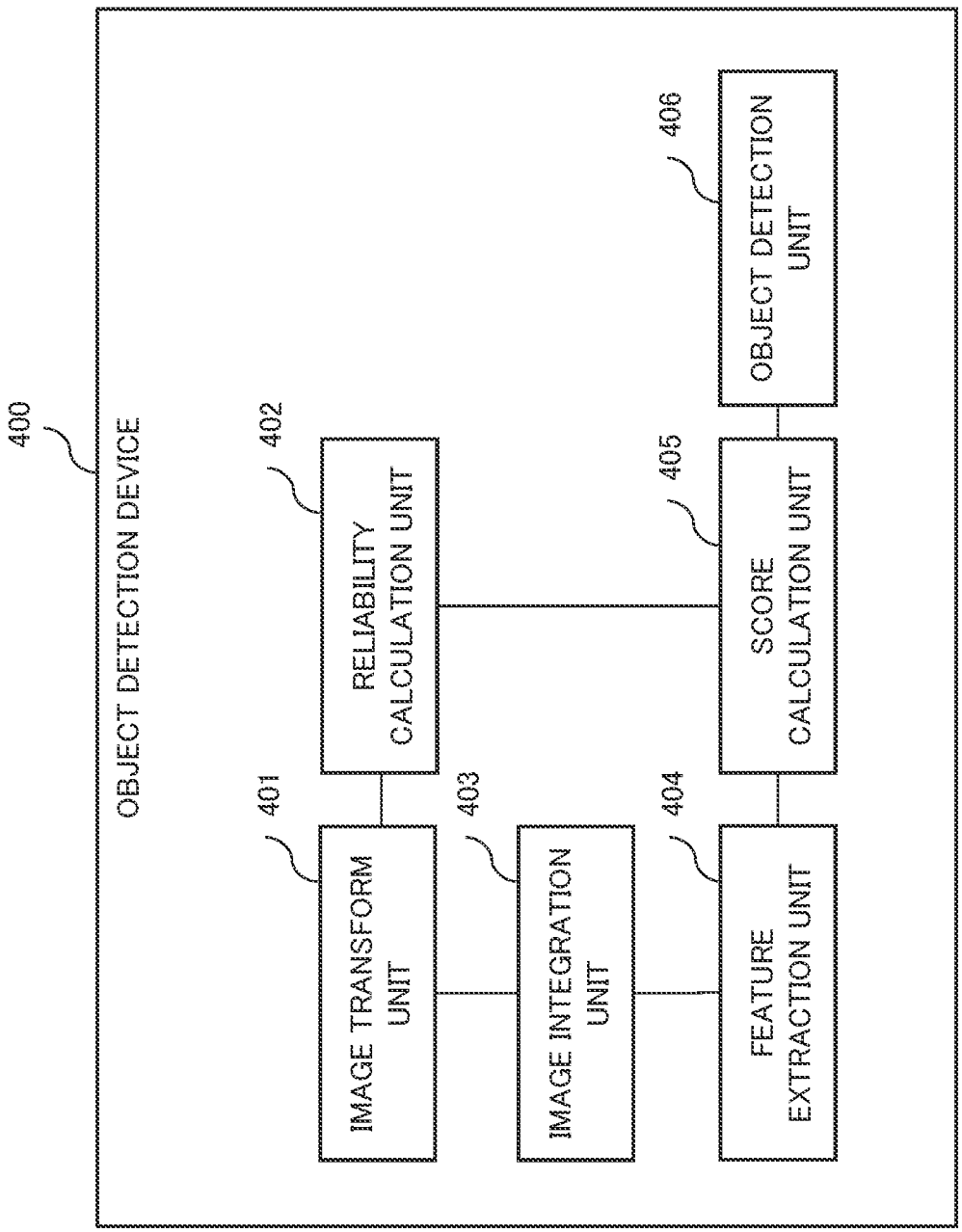
FIG. 4 is a block diagram showing the configuration of an object detection device according to a second example embodiment.

FIG. 4 is a block diagram showing the configuration of an object detection device 400 according to the present example embodiment. As shown in FIG. 4, the object detection device 400 includes an image transform unit 401, a reliability calculation unit 402, an image integration unit 403, a feature extraction unit 404, a score calculation unit 405, and an object detection unit 406.

Of a first image and a second image captured by one or more imaging devices, the image transform unit 401 transforms the second image, to make a transformed second image.

The reliability calculation unit 402 calculates the reliability indicating how small the positional difference between the first image and the transformed second image is.

The image integration unit 403 integrates each pixel of the first image and each corresponding pixel of the transformed second image, to make an integrated image.

The feature extraction unit 404 extracts a feature amount from each rectangular region in the integrated image, and calculates an object detection score indicating the probability that each rectangular region includes an object, using the extracted feature amounts.

The score calculation unit 405 calculates an overall score, with both the degree of reliability and the level of the object detection score being taken into consideration.

On the basis of the calculated overall score, the object detection unit 406 determines whether each rectangular region in the integrated image includes an object.

(Effects of the Present Example Embodiment)

According to the configuration of the present example embodiment, an object detection device calculates reliability, on the basis of the correlation between a first image and a transformed second image. The reliability indicates how small the positional difference between the first image and the transformed second image is. That is, the smaller the positional difference between the first image and the transformed second image, the higher the reliability.

The object detection device also generates an integrated image from the first image and the transformed second image. An overall score is then calculated, with the calculated reliability and the object detection score based on the feature amount of the integrated image being taken into consideration.

In this manner, the object detection device according to the present example embodiment detects an object in the integrated image, not simply on the basis of the object detection score based on the feature amount, but on the basis of the overall score with the reliability indicating the correlation between the first image and the transformed second image being taken into consideration. Accordingly, the object in the integrated image can be detected with high accuracy.

Third Example Embodiment (Hardware Configuration)

Figure 5:
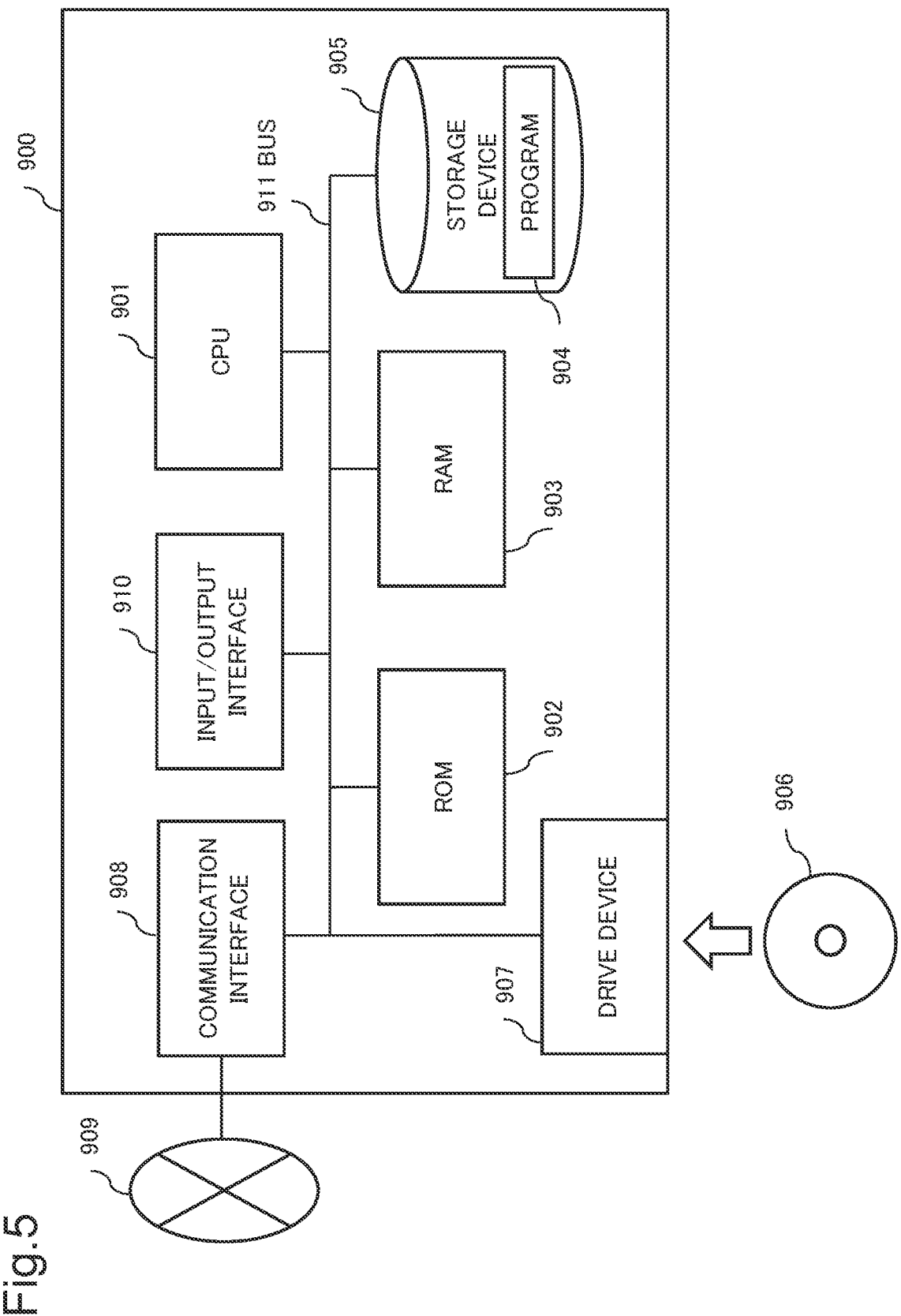
FIG. 5 is a diagram showing the hardware configuration of an information processor according to a third example embodiment.

In each example embodiment of the present disclosure, each component of each device represents a block of functional units. Part or all of each component of each device is formed by a combination of an information processor 900 and a program shown in FIG. 5, for example. FIG. 5 is a block diagram showing an example hardware configuration of the information processor 900 that achieves each component of each device.

As shown in FIG. 5, the information processor 900 includes components as listed below, for example.

A central processing unit (CPU) 901
A read only memory (ROM) 902
A random access memory (RAM) 903
A program 904 to be loaded into the RAM 903
A storage device 905 for storing the program 904
A drive device 907 that performs reading and writing on the recording medium 906
A communication interface 908 connected to a communication network 909
An input/output interface 910 that inputs and outputs data
A bus 911 that connects the components Each component of each device in each example embodiment is achieved by the CPU 901 acquiring and executing the program 904 for achieving these functions. The program 904 for achieving the function of each component of each device is stored beforehand in the storage device 905 or the ROM 902, and is loaded into the RAM 903 and executed by the CPU 901 as required. The program 904 may be supplied to the CPU 901 through the communication network 909, or may be stored beforehand in a recording medium 906 so that the drive device 907 can read out and supply the program to the CPU 901.

(Effects of the Present Example Embodiment)

According to the configuration of the present example embodiment, a device described in one of the above example embodiments is implemented as hardware. Thus, the same effects as those described in one of the above example embodiments can be achieved.

The specific configuration of the present invention is not limited to the example embodiments described above, and any modification that does not depart from the scope of the present invention is included in the present invention.

REFERENCE SIGNS LIST

1 image processing system
101 first image input unit
102 second image input unit
200 data processing device
201 image transform unit
202 reliability calculation unit
203 image integration unit
204 feature extraction unit
205 score calculation unit
206 object detection unit
301 output unit
400 object detection device
401 image transform unit
402 reliability calculation unit
403 image integration unit
404 feature extraction unit
405 score calculation unit
406 object detection unit

The invention claimed is:

1. An object detection device comprising:
a memory configured to store a computer program; and
at least one processor configured to run the computer program to perform:
transforming, of a first image and a second image that are captured by one or more imaging devices, the second image to make a transformed second image;
calculating a reliability indicating how small a positional difference between the first image and the transformed second image is;
generating an integrated image by integrating each pixel of the first image and each corresponding pixel of the transformed second image;
extracting a feature amount from the integrated image, and calculating an object detection score indicating a probability that the integrated image includes an object, using the extracted feature amount;
calculating an overall score, with both a degree of the reliability and a level of the object detection score being taken into consideration; and
an object detecting means for detecting an object included in the integrated image, based on the overall score.

2. The object detection device according to claim 1, wherein the at least one processor is configured to run the computer program to perform:
object detection in each region of a plurality of regions set in the integrated image; and
when a plurality of regions includes the same object, outputting information indicating one representative region as a result of the object detection.

3. The object detection device according to claim 2, wherein
the at least one processor is configured to run the computer program to perform
determining that a plurality of regions in which the coordinates of four vertices defining the regions or the central coordinates of rectangles defining the regions are close to one another includes the same object.

4. The object detection device according to claim 1, the at least one processor is further configured to run the computer program to perform generating and outputting an integrated image having a higher visibility than the first image and the second image.

5. The object detection device according to claim 1, wherein
the at least one processor is configured to run the computer program to perform
determining a type of transform of the second image, in accordance with a positional relationship between an imaging device that captures the first image and another imaging device that captures the second image.

6. The object detection device according to claim 1, wherein
the overall score is an increasing function for both the degree of the reliability and the level of the object detection score.

7. An image processing system comprising:
the object detection device according to claim 1: and
one or more imaging devices that input a first image including an object to the object detection device;
the image processing system is configured to output
a result of object detection performed by the object detection device.

8. An object detection method comprising:
transforming, of a first image and a second image that are captured by one or more imaging devices, the second image to make a transformed second image;
calculating a reliability indicating how small a positional difference between the first image and the transformed second image is;
generating an integrated image by integrating each pixel of the first image and each corresponding pixel of the transformed second image;
extracting a feature amount from the integrated image, and calculating an object detection score indicating a probability that the integrated image includes an object, using the extracted feature amount;
calculating an overall score, with both a degree of the reliability and a level of the object detection score being taken into consideration; and
detecting an object included in the integrated image, based on the overall score.

9. A non-transitory recording medium recording a program for causing a computer to:
transform, of a first image and a second image that are captured by one or more imaging devices, the second image to make a transformed second image;
calculate a reliability indicating how small a positional difference between the first image and the transformed second image is;
generate an integrated image by integrating each pixel of the first image and each corresponding pixel of the transformed second image;
extract a feature amount from the integrated image, and calculate an object detection score indicating a probability that the integrated image includes an object, using the extracted feature amount;
calculate an overall score, with both a degree of the reliability and a level of the object detection score being taken into consideration; and
detect an object included in the integrated image, based on the overall score.

* * * * *